(12) United States Patent
Nakamura et al.

(10) Patent No.: US 7,144,611 B2
(45) Date of Patent: Dec. 5, 2006

(54) TRIMMING MATERIALS FOR AUTOMOBILES

(75) Inventors: Tetsuya Nakamura, Aichi-ken (JP); Kazuo Tanabe, Aichi-ken (JP); Rintaro Senoo, Aichi-ken (JP)

(73) Assignee: Toyoda Boshoku Corporation, Aichi-ken (JP)

( * ) Notice: Subject to any disclaimer, the term of this patent is extended or adjusted under 35 U.S.C. 154(b) by 224 days.

(21) Appl. No.: 10/754,019

(22) Filed: Jan. 7, 2004

(65) Prior Publication Data

US 2004/0142121 A1    Jul. 22, 2004

(30) Foreign Application Priority Data

Jan. 8, 2003 (JP) .............................. 2003-002228

(51) Int. Cl.
- B32B 7/02 (2006.01)
- B32B 7/12 (2006.01)
- B32B 27/00 (2006.01)
- B60R 13/02 (2006.01)

(52) U.S. Cl. ...................... 428/31; 428/212; 428/411.1

(58) Field of Classification Search .................. 428/31, 428/212, 347, 354, 411.1
See application file for complete search history.

(56) References Cited

FOREIGN PATENT DOCUMENTS

| FR | 2481210 A | * 10/1981 |
|----|-----------|-----------|
| JP | 6-278260  | 10/1994   |

OTHER PUBLICATIONS

Derwent abstract of JP 6-278260 A, Oct. 1994.*
Derwent abstract of FR 2481210 A, Oct. 1981.*
English translation of JP 06-278260 A, Oct. 1994.*
English translation of FR 2,481,210 A2, Oct. 1981.*

* cited by examiner

Primary Examiner—Ramsey Zacharia
(74) Attorney, Agent, or Firm—Patterson, Thuente, Skaar & Christensen, P.A.

(57) ABSTRACT

A trimming material for an automobile includes a surface skin material, a base material, and a colored resin film interposed between the surface skin material and the base material. The surface skin material and the base material are bonded to each other via the resin film. The resin film includes a surface-side adhesion layer on the side of the surface skin material, a base-side adhesion layer on the side of the base material, and a barrier layer interposed between the surface-side adhesion layer and the base-side adhesion layer and bonded thereto. The barrier layer is made of non-gas and liquid permeable material that is not melted at a temperature that causes the surface-side adhesion layer and the base-side adhesion layer to be melted.

7 Claims, 5 Drawing Sheets

TRIMMING MATERIALS FOR AUTOMOBILES

This application claims priority to Japanese patent application serial number 2003-002228, the contents of which are incorporated herein by reference.

BACKGROUND OF THE INVENTION

1. Technical Field

The present invention relates to trimming materials (upholstery) for automobiles, and in particular to trimming materials that has a surface skin (covering) material and a base material bonded to each other via a colored resin film interposed therebetween.

2. Description of the Related Art

Japanese Laid-Open Patent Publication No. 6-278260 teaches a known trimming material. This known trimming material is shown in a vertical cross sectional view in FIG. 5(A) and is labeled with reference numeral 50. The known trimming material 50 comprises a base material, e.g., a felt sheet, a resin film 53, and a surface skin material 55 that may be made of non-woven fabric. The resin film 53 is colored to be similar to the color of the surface skin material 55. The resin film 53 may be melted by heat, so that the resin film 53 can partly impregnate into the rear surface of the surface skin material 55 and into the front surface of the base material 51, as shown in FIG. 5(B). The surface skin material 55 and the base material 51 are then pressed from opposing sides, so that the surface skin material 55 and the base material 51 may be bonded to each other by the resin film 53 as indicated by two-dotted chain lines in FIG. 5(B). Because the color of the resin film 53 is similar to the color of the surface skin material 55, the base material 51 may not be easily seen from the side of the surface skin material 55, even if the surface skin material 55 has a relatively thin thickness for the overall purpose of reducing trimming material weight.

The manufacturing process of the known trimming material 50 includes the step of simultaneously impregnating the melted resin film 53 into the upper surface skin material 55 and into the lower base material 51. Therefore, when the melted resin travels upwards and downwards, it is likely that a plurality of pinholes 53p are formed in the resin film 53 extending throughout the thickness of the resin film 53 as illustrated in FIG. 5(B). The pinholes 53p thus formed may not be completely removed even after the surface skin material 55 and the base material 51 have been pressed from opposite sides as indicated by two-dotted chain lines in FIG. 5(B). The pinholes 53p may give a mottled appearance to the resin film 53. Therefore, when the surface skin material 55 is very thin, the mottled appearance of the resin film 53 may be seen through the surface skin material 55. As a result, the appearance of the trimming material 50 may be degraded, as viewed from its ornamental surface, i.e., the front surface of the surface skin material 55.

SUMMARY OF THE INVENTION

It is accordingly an object of the present invention to teach improved techniques for preventing or minimizing the mottling of a resin film of a trimming material when a surface skin material and a base material are bonded to each other via the resin film.

According to one aspect of the present teachings, trimming materials for automobiles are taught that include a surface skin material, a base material, and a colored resin film interposed between the surface skin material and the base material. The surface skin material and the base material are bonded to each other via the resin film. The resin film includes a surface-side adhesion layer on the side of the surface skin material, a base-side adhesion layer on the side of the base material, and a barrier layer bonded to and interposed between the surface-side adhesion layer and the base-side adhesion layer. The base-side adhesion layer is bonded to a front surface of the base material by heating the base-side adhesion layer and allowing the melted portion of the base-side adhesion layer to partly permeate into the front surface of the base material. The surface-side adhesion layer is bonded to a rear surface of the surface skin material by heating the surface-side adhesion layer and allowing the melted portion of the surface-side adhesion layer to partly permeate into the rear surface of the surface skin material. The barrier layer is made of non-permeable material that does not substantially melt at the temperature that causes the melting of the surface-side adhesion layer and the base-side adhesion layer. In other words, the barrier layer has a melting point that is higher than the melting points of the surface-side adhesion layer and the base-side adhesion layer.

Therefore, when the base side-adhesion layer has been melted, it may partly permeate into the front surface of the base material but may not permeate into the barrier layer. As a result, a relatively non-defective bonding surface between the base-side adhesion layer and the barrier layer can be ensured, so that relatively no pinholes are formed in the base-side adhesion layer through the thickness of the base-side adhesion layer. Similarly, when the surface-side adhesion layer has been melted, it may partly permeate into the rear surface of the surface skin material but may not permeate into the barrier layer. As a result, a non-defective bonding surface of the surface-side adhesion layer to the barrier layer can also be ensured, so that relatively no pinholes are formed in the surface-side adhesion layer through the thickness of the surface-side adhesion layer. In addition, the barrier layer may not melt even when the surface-side adhesion layer and the base-side adhesion layer have melted due to the difference in melting temperatures.

Because relatively no pinholes are produced in the resin film during the bonding operation between the base material and the surface skin material via the resin film, the resin film may appear substantially mottle free. Therefore, even if the surface skin material has a thin thickness, the overall appearance of an ornamental surface of the trimming material (i.e. the front surface for example) may not be degraded.

According to another aspect of the present teachings, the surface-side adhesion layer and the base-side adhesion layer are made of a first resin and a second resin, respectively, and are adapted to be melted when heated. The melted second resin has less flowability than the melted first resin. Additionally, the base-side adhesion layer can be colored while the barrier layer and the surface-side adhesive layer may not be colored.

Because the second resin of the colored base-side adhesion layer has less flowability than the first resin of the surface-side adhesion layer, the mottling of the resin film can be further reliably prevented. Although the barrier layer and the surface-side adhesive layer may be transparent and colorless, they may still be slightly colored. The color preferably is slight enough so as to not unintentionally influence the color of the base-side adhesion layer.

According to an additional aspect of the present teachings, the barrier layer is colored while the base-side adhesion layer and the surface-side adhesion layer are not colored. With this coloring selection, the colored barrier layer may not melt even while the base-side and surface-side adhesion layers have been melted. Therefore, the mottling can be further readily prevented.

According to a further aspect of the present teachings, the resin film is colored with a color similar to a color of the surface skin material.

According to another aspect of the present teachings, the barrier layer is colored with a first color and the base-side adhesion layer is colored with a second color. The first color of the barrier layer and the second color of the base-side adhesion layer exhibit a third color when overlaid with each other, and the third color is similar to a color of the surface skin material.

According to a further aspect of the present teachings, the resin film is colored with a different color from a color of the surface skin material. The resin film and the surface skin material exhibit a predetermined color when overlaid with each other.

According to another aspect of the present teachings, resin films are taught that are used for manufacturing a trimming material of an automobile. The resin films may include a barrier layer made of resin and having a property of relatively no liquid-permeability, and a first and second adhesion layer made of resin and respectively disposed on opposite sides of the barrier layer. Each of the first and second adhesion layers has a melting point that is lower than a melting point of the barrier layer. At least one of the barrier layer, the first adhesion layer, and the second adhesion layer, is colored.

Therefore, as long as the heating temperature is higher than the melting points of the first and second layers but lower than the melting point of the barrier layer, the barrier layer may not melt even when the first and second layers have been melted. As a result, the melted first and second layers may not permeate into the barrier layer. The lack of permeation into the barrier layer results in relatively no pinholes being formed in the first and second layers when the first and second layers are heated for bonding to a surface skin material and a base material, respectively, in the course of manufacturing the trimming material. As a result, the resin film may be relatively free from a mottled appearance.

Preferably, the first adhesion layer and the second adhesion layer have melt indexes that are different from each other.

According to a further aspect of the present teachings, methods of manufacturing trimming materials are taught. The method includes the following steps:

preparing a colored film that includes a barrier layer, a surface-side adhesion layer, and a base-side adhesion layer disposed on opposite sides of a barrier layer;

overlaying the film with a surface skin material and a base material on opposite sides of the film;

heating the film, the surface skin material, and the base material, at a temperature that is higher than the melting points of the surface-side adhesion layer and the base-side adhesion layer, but is lower than the melting point of the barrier layer; so that the surface-side adhesion layer and the base-side adhesion layer are melted and cooling the heated film, the surface skin material, and the base material, so that the surface-side adhesion layer and the base-side adhesion layer are bonded to the surface skin material and the base material, respectively.

Therefore, the melted surface-side and base-side adhesion layers may not permeate the barrier layer but may be reliably bonded to the surface skin material and the base material. As a result, the color film may not be mottled in appearance.

According to another aspect of the present teachings, methods of manufacturing trimming materials are taught. The method includes the following steps:

preparing a colored film that includes a barrier layer, a surface-side adhesion layer, and a base-side adhesion layer disposed on opposite sides of a barrier layer;

overlaying the film with a base material, wherein the base material is made of a mixture of resin fibers and glass fibers;

heating the film and the base material at a first temperature that is higher than the melting points of the base-side adhesion layer and the resin fibers, but is lower than the melting point of the barrier layer; so that the base-side adhesion layer and the resin fibers are melted pressing the film and the base material from opposite sides;

cooling the heated film and the base material, so that the base-side adhesion layer is bonded to the base material and the resin fibers are bonded to the glass fibers;

cutting the cooled film with the base material to form a first configuration;

overlaying a surface skin material with the cooled film on the side opposite to the base material;

heating the film, the base material and the surface skin material at a second temperature that is higher than the melting point of the surface-side adhesion layer but is lower than the melting point of the barrier layer; so that the surface-side adhesion layer is melted; and cold pressing the heated film, the base material and the surface skin material, so that the film with the base material and the surface skin material are bonded to each other and are formed to have a second configuration.

The second configuration may be a configuration that is suited to the use of the trimming material. For example, the second configuration may be suited to the configuration of the ceiling material. Therefore, the trimming material may be formed to have a desired configuration while the resin film may not be mottled.

BRIEF DESCRIPTION OF THE DRAWINGS

Additional objects, features, and advantages, of the present invention will be readily understood after reading the following detailed description together with the claims and the accompanying drawings, in which:

DETAILED DESCRIPTION OF THE INVENTION

Each of the additional features and teachings disclosed above and below may be utilized separately or in conjunction with other features and teachings to provide improved trimming materials and resin films, and improved methods of manufacturing and using such trimming materials and resin films. Representative examples of the present invention, which utilize many of these additional features and teachings both separately and in conjunction with each other, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

A first representative embodiment will now be described with reference to FIGS. 1(A), 1(B), and 1(C), FIGS. 2(A), 2(B), and 2(C), and FIGS. 3(A), 3(B), and 3(C), which show a first representative trimming material 10 for automobiles and a first representative method for manufacturing the first representative trimming material.

Figure 1:
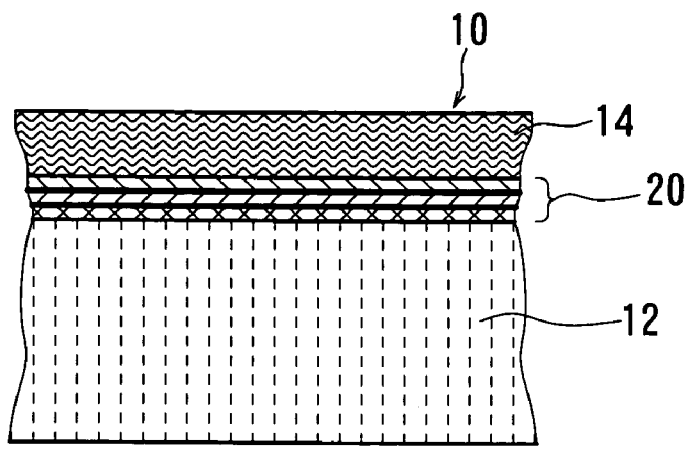
FIG. 1(A) is a vertical sectional view of a first representative trimming material for an automobile.
FIG. 1(B) is an exploded view of the first representative trimming material.
FIG. 1(C) is an enlarged vertical sectional view of a resin film of the first representative trimming material.
Figure 1:
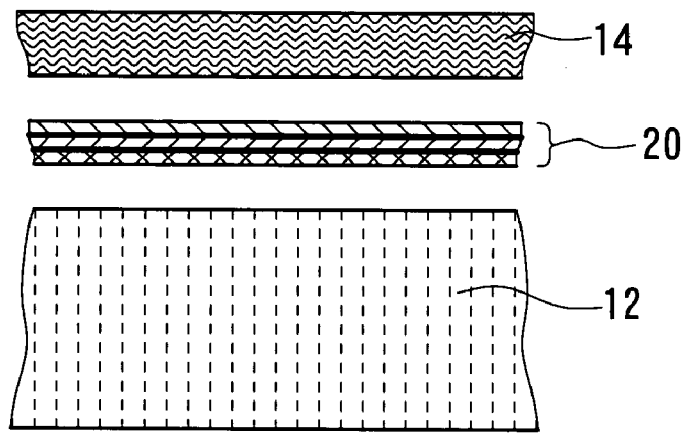
Figure 1:
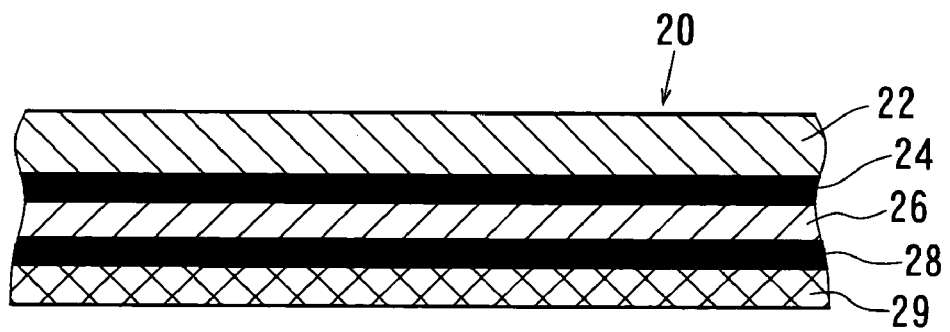

The first representative trimming material 10 may preferably be used as a ceiling material of an automobile interior (not shown), although it can be used for any other trimming purposes. As shown in FIGS. 1(A) and 1(B), the first representative trimming material 10 comprises a base material 12, a resin film 20, and a surface skin material 14.

The base material 12 is a major component material of the trimming material 10 and may include glass fibers and resin fibers, e.g., polypropylene (PP) fibers. The fibers are formed to have a mat-like configuration, so that the base material 12 has the property of being both gas and liquid permeable. The base material 12 may be formed into a desired configuration by a hot press-molding operation. In general, the average surface density (mass per unit area) of the base material 12 is preferably chosen to be about 1,000 g/m$^2$.

The surface skin material 14 has a front surface that primarily serves as an ornamental surface of the trimming material 10. The surface skin material 14 may be made of a non-woven fabric that includes resin fibers, e.g., polyethylene terephthalate (PET) fibers. Preferably, the surface density of the surface skin material 14 is chosen to be about 180 g/m$^2$, helping to achieve an overall goal of lightweight construction.

The resin film 20 is a colored film that serves to bond the surface skin material 14 to the base material 12 and also serves as a colored shield to prevent the base material 12 from being seen though the surface skin material 14. As shown in FIG. 1(C), the resin film 20 includes a surface-side adhesion layer 22 on the side of the surface skin material 14, a first mutual adhesion layer 24, a barrier layer 26, a second mutual adhesion layer 28, and a base-side adhesion layer 29 on the side of the base material 12.

The surface-side adhesion layer 22 serves to bond the resin film 20 to the surface skin material 14 and may have a thickness of about 35 μm in this representative embodiment. Preferably, the surface-side adhesion layer 22 is made of a low-density polyethylene (LDPE) film that is transparent and colorless. In addition, the surface-side adhesion layer 22 preferably has a melting point of about 107° C. and has a melt index (MI) of about 12.5.

Here, the melt index (MI) represents a volumetric flow rate of a melted resin that is extruded through an orifice having a known inner diameter under a controlled pressure and a controlled temperature. The flowability of the melt resin correspondingly increases as the value of MI increases.

The base-side adhesion layer 29 serves to bond the resin film 20 to the base material 12 and may have a thickness of about 15 μm in this representative embodiment. Preferably, the base-side adhesion layer 29 is made of a linear low-density polyethylene (LLDPE) film that is colored with a color similar to the color of the surface skin material 14. In addition, the base-side adhesion layer 29 preferably has a melting point of approximately 123° C. and has a melt index (MI) of about 1.0. In the melted condition of this embodiment, the flowability of the base-side adhesion layer 29 is lower than the flowability of the surface-side adhesion layer 22.

The barrier layer 26 serves as a partition layer that is interposed between the surface-side adhesion layer 22 and the base-side adhesion layer 29. In addition, the barrier layer 26 has a high melting point along with the property of relatively no gas and liquid permeability. Barrier layer 26 preferably has a thickness of about 15 μm and may be made of a transparent and colorless nylon (NY) film with a melting point of approximately 225° C. Therefore, the barrier layer 26 may not melt even if barrier layer 26 has been heated to the melting point of either the surface-side adhesion layer 22 and/or the base-side adhesion layer 29.

The first mutual adhesion layer 24 serves to bond the surface-side adhesion layer 22 and the barrier layer 26. The second mutual adhesion layer 28 serves to bond the barrier layer 26 to the base-side adhesion layer 29. Preferably, the two mutual adhesion layers are made of transparent and colorless modified polyethylene (PE) films each having a thickness of about 7.5 μm. In addition, each of the two mutual adhesion layers, 24 and 28, has a melting point of approximately 120° C. and a melt index of approximately 4.5.

As described above, the resin film 20 is composed of transparent and colorless layers including the surface-side adhesion layer 22, the first mutual adhesion layer 24, the barrier layer 26, the second mutual adhesion layer 28, and a colored layer comprising the base-side adhesion layer 29. Base-side adhesion layer 29 is colored with a color similar to the surface skin layer 14. Therefore, when the resin film 20 is observed from the side of the surface-side adhesion layer 22, the resin film 20 may appear to be colored similarly to the surface skin layer 14.

The representative method for manufacturing the first representative trimming material 10 will now be described with reference to FIGS. 2(A) through 2(C), and FIGS. 3(A) through 3(C).

Figure 2:
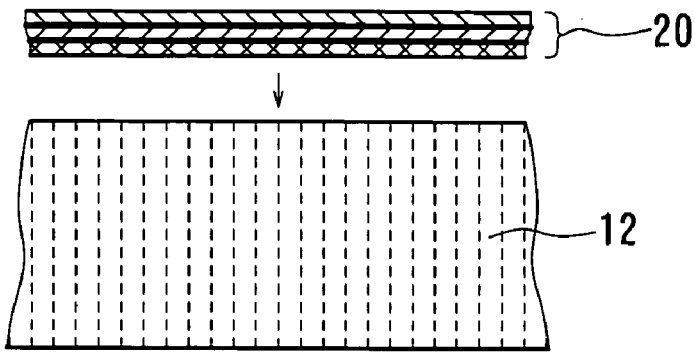
FIGS. 2(A), 2(B), and 2(C), and FIGS. 3(A), 3(B), and 3(C), are all views showing various steps of manufacturing the first representative trimming material.
Figure 2:
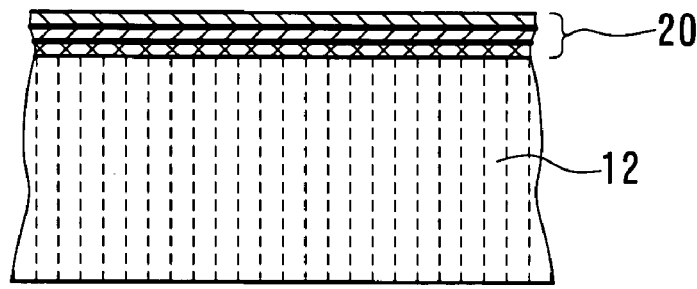
Figure 2:
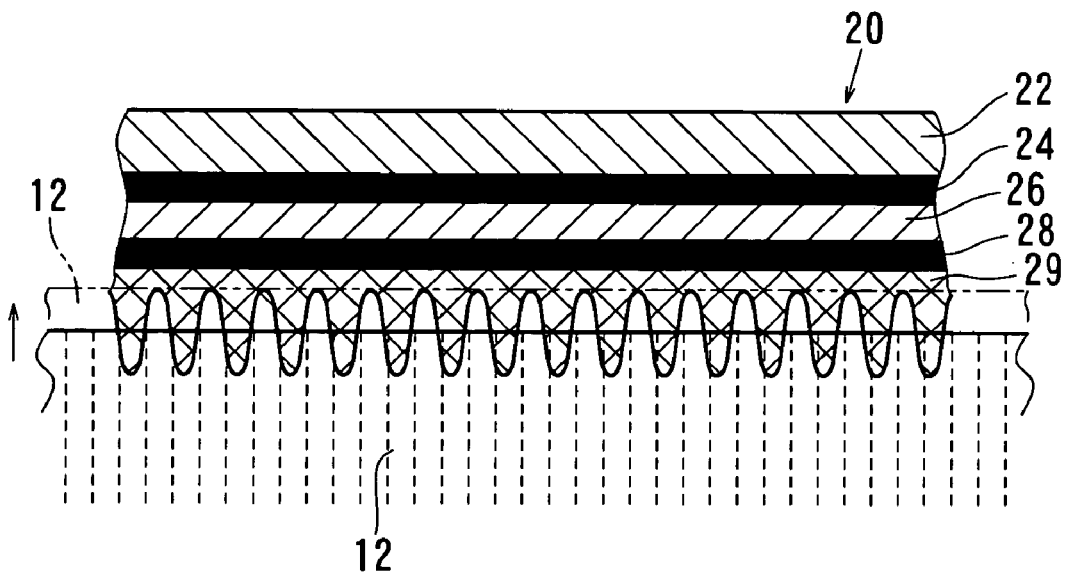

First, as shown in FIG. 2(A), the resin film 20 is laid over the upper surface of the base material 12 (formed with a mat-like configuration). Then, the base material 12 with the resin film 20 is conveyed through a heating furnace (not shown) previously heated to a temperature of approximately 190° C. The base material 12 along with the resin film 20 are subsequently pressed from both upper and lower directions by a press machine (not shown). As a result, the base-side adhesion layer 29 of the resin film 20 is melted and permeates into the upper surface of the base material 12, bonding the resin film 20 to the base material 12 as schematically shown in FIG. 2(C).

Because of the difference in melting point temperatures, barrier layer 26 will not significantly melt even while the base-side adhesion layer 29 has been heated to the melting point during the above process. In addition, barrier layer 26 is not significantly permeable to either gas or liquid. Therefore, although the base-side adhesion layer 29 may be melted and partly permeate the base material 12, the upper adhesive surface of the base-side adhesion layer 29 is kept bonded to the barrier layer 26 via the second mutual adhesion layer 28. As a result, relatively no pinholes are either formed in the base-side adhesion layer 29, or extend therethrough.

In addition, because the base material 12 with the resin film 20 is passed through the heating furnace and then pressed by the pressing machine, the resin fibers of the base material 12 may also be partly melted and reliably bonded to the glass fibers of the base material 12.

When the pressing forces applied to the base material 12 and the resin film 20 are released, after the resin film 20 has been bonded to the base material 12, the compressed base material 12 may substantially recover the original thickness due to natural, resilient, or compulsive (vacuum expansion), restoration of the base material 12. Thereafter, the base material 12 with the resin film 20 may be conveyed to a cooling section (not shown), so that the assembly may be cooled to substantially room temperature. The cooled base material 12 with resin film 20 may then be cut to have a desired configuration.

Next, the surface skin material 14 is laid over the resin film 20 previously bonded to the base material 12. The surface skin material 14 with the base material 12 and the resin film 20 is conveyed into a second heating furnace (not shown) preheated to a temperature of approximately 190° C. The heated assembly including the surface skin material 14 and the base material 12 previously bonded to resin film 20 is then set into a cold press molding machine (not shown) in order to be pressed into a desired configuration. For example, the cold press molding machine may contain a mold with a molding surface conforming to the configuration of an intended ceiling of an automobile. By these steps, the surface-side adhesion layer 22 may be melted and partly permeate into the rear surface of the surface skin layer 14, so that the resin film 20 is subsequently bonded to the surface skin material 14 as indicated by the 'two-dotted' chain lines in FIG. 3(C). At the same time as this bonding process, the surface skin layer 14 along with the resin film 20 and base material 12 is shaped to a desired configuration, e.g., the configuration of the intended ceiling for example. The shaping process completes the manufacturing of trimming material 10.

Figure 3:
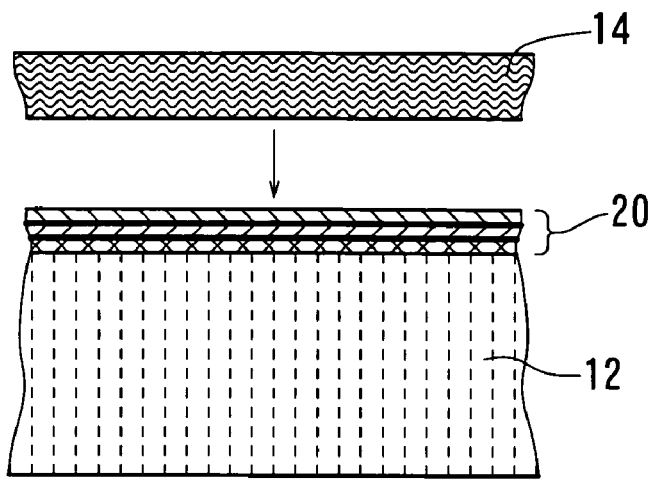
Figure 3:
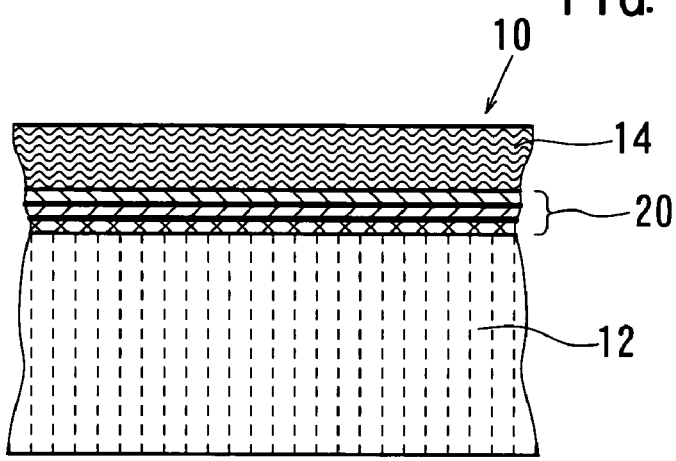
Figure 3:
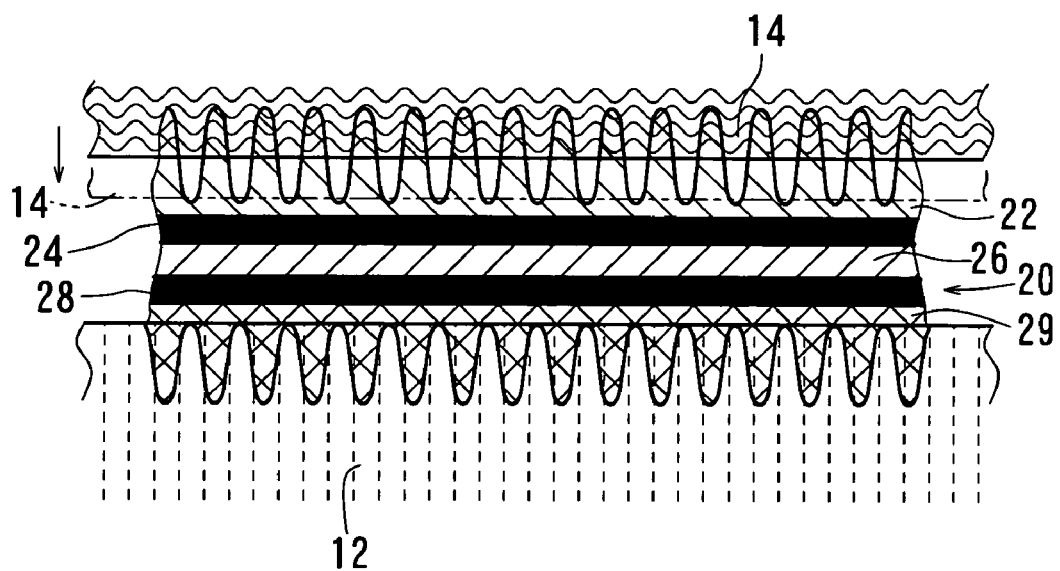

Here again, the barrier layer 26 may not significantly melt even while being heated to a temperature that melts the surface-side adhesion layer 22. The barrier layer 26 retains a non-permeable property. Therefore, even if the surface-side adhesion layer 22 has melted and partly flows upward towards the surface skin material 14, the lower adhesion surface of the surface-side adhesion layer 22 is kept bonded to the barrier layer 26 via the first mutual adhesion layer 24 as shown in FIG. 3(C). As a result, relatively no pinholes are formed in the surface-side adhesion layer 22.

Because relatively no pinholes are formed in the resin film 20 during the process of bonding the base material 12 to the surface skin material 14, the resin film 20 may appear not to be mottled. Therefore, even if the thickness of the surface skin material 14 is reduced in order to provide a light-weight construction, the resulting appearance of the ornamental surface of the trimming material 10 may not be degraded.

In addition, because the base-side adhesion layer 29 of the resin film 20 is colored similarly to the surface skin material 14, the base material 12 may be hidden from view from the side of the surface skin material 14, even if the surface skin material 14 is relatively thin.

Furthermore, because the melted base-side adhesion layer 29 containing color exhibits lower flowability than the melted surface-side adhesion layer 22, the resin film 20 may be further inhibited from appearing mottled.

Although the base-side adhesion layer 29 of the resin film 20 is colored to be similar to the color of the surface skin material 14 while the other adhesion layers 22, 24, 28, and the barrier layer 26, are essentially colorless and transparent in the first representative trimming material 10, the present invention may not be limited to this arrangement but may be modified in various ways.

Second Representative Embodiment

Figure 4:
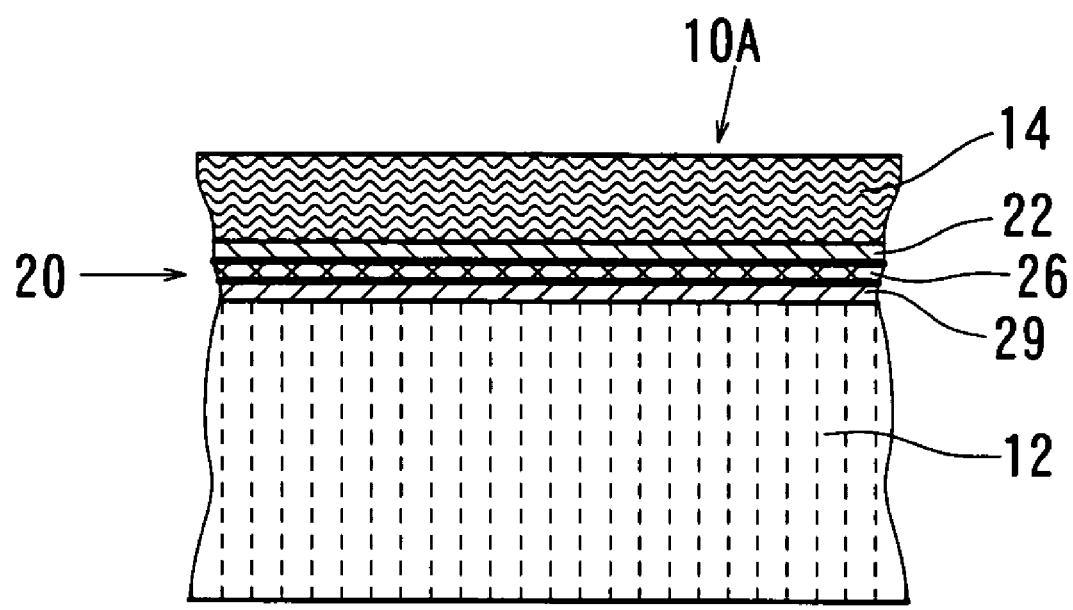
FIG. 4 is a view similar to FIG. 1(A) but showing a second representative trimming material.
Figure 5:
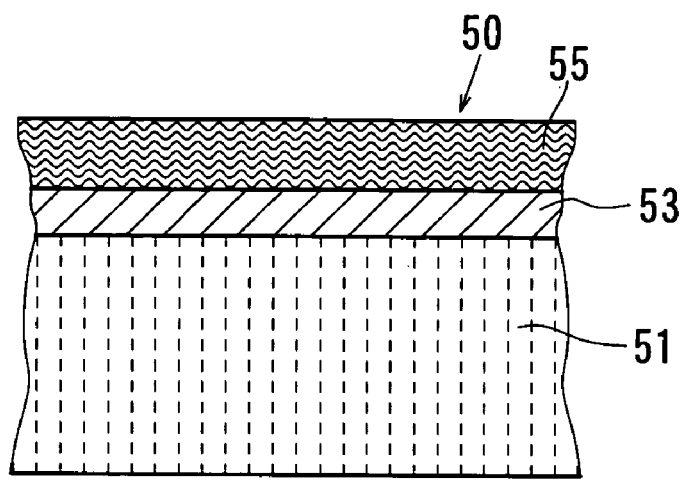
FIG. 5(A) is a vertical sectional view of a known trimming material for an automobile.
FIG. 5(B) is an enlarged view of a resin film of a known trimming material.
Figure 5:
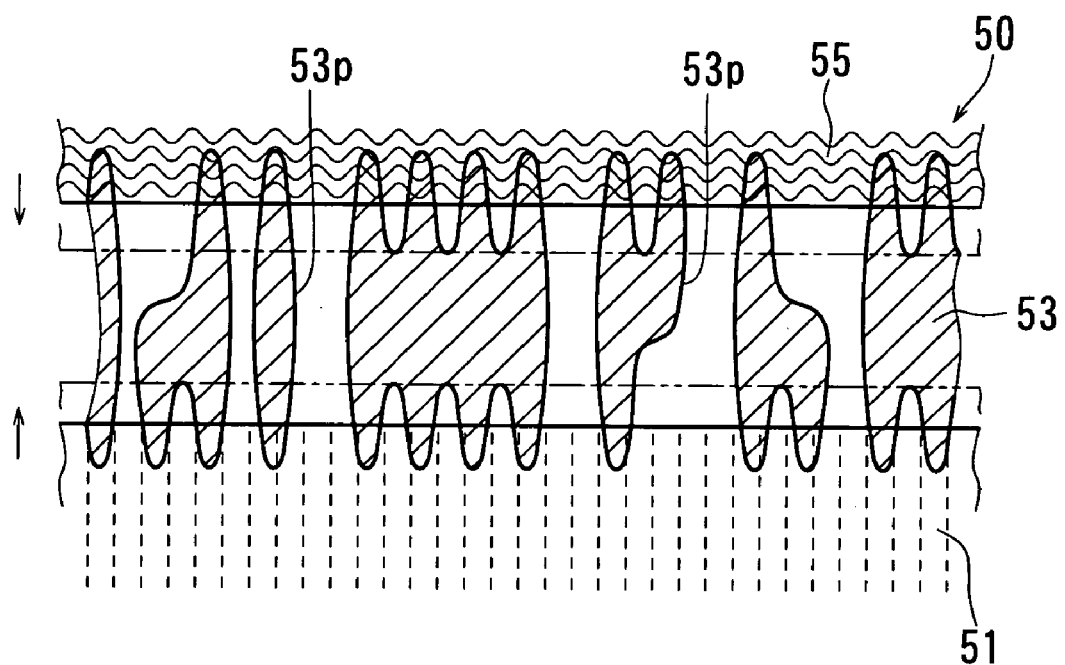

FIG. 4 shows a second representative trimming material 10A that is a modification of the first representative trimming material 10. In FIG. 4, elements that are similar to or identical with the first representative trimming material 10 are labeled with the same reference numerals and an explanation of these elements will not be repeated. The second representative trimming material 10A is different from the first representative trimming material 10 essentially in the following two ways: (1) the barrier layer 26 of the resin film 20 is colored to be similar to the color of the surface skin material 14, and (2) the base-side adhesion layer 29 is transparent and non-colored. In most other respects, the barrier layer 26 and the surface skin material 29 of the second representative trimming material 10A are respectively the same as the barrier layer 26 and the surface skin material 29 of the first representative trimming material 10. Therefore, the second representative trimming material 10A can be manufactured by the same method as the first representative method. Also with this arrangement, the resin film 20 may be further inhibited from appearing to be mottled.

In another alternative embodiments, the barrier layer 26 and the base-side adhesion layer 29 are both colored to be similar to the color of the surface skin material 14, and the other layers 22, 24, and 28, are transparent and colorless.

In an additional alternative embodiment, both of the base-side adhesion layer 29 and the barrier layer 26 may be colored so that these colored layers in combination can exhibit a color similar to the color of the surface skin layer 14.

In a further alternative embodiment, the barrier layer 26 and/or the base-side adhesion layer 29 are colored so as to be different than the color of the surface skin material 14. For example, the barrier layer 26 and/or the base-side adhesion layer 29 may have an achromatic color with brightness similar to the brightness of the color of the surface skin material 14.

In a further alternative embodiment, the base-side adhesion layer 29 or the barrier layer 26 may be colored differently than the color of the surface skin layer 14, or the combination of the base-side adhesion layer 29 and the barrier layer 26 may exhibit a color that is different from the color of the surface skin layer 14. The different color in combination with the color of the surface skin layer 14 may exhibit an even further different color that is desired for the assembled trimming material.

Furthermore, although the above representative embodiments have been described in connection with trimming materials that are used as ceiling materials, the present invention may be applied to other trimming materials in other vehicles or applications than those used as ceiling materials for automobiles.

What is claimed is:

1. A trimming material for an automobile comprising:
    a surface skin material;
    a base material; and
    a colored film interposed between the surface skin material and the base material comprising;
        a surface-side adhesion layer bonded to the surface skin material, and
        a base-side adhesion layer bonded to the base material, and
        a barrier layer interposed between the surface-side adhesion layer and the base-side adhesion layer and bonded thereto;
        a first mutual adhesion layer interposed between the surface-side adhesion layer and die barrier layer, and
        a second mutual adhesion layer interposed between the base-side adhesion layer and the barrier layer, wherein;
    each of the surface-side adhesion layer and the base-side adhesion layer is a solid layer made of resin and is melted by heat to a liquid phase during formation of the trimming material;
    the barrier layer is made of a non-permeable resin material that prevents the melted surface-side adhesion layer and the melted base-side adhesion layer from entering the barrier layer;
    the barrier layer has a melting point that is higher than a melting point of either of the individual melting points of the surface-side adhesion layer and the base-side adhesion layer; and
    each of the first mutual adhesion layer and the second mutual adhesion layer is made of resin having a melting point lower than the melting point of the barrier layer.

2. A trimming material as in claim 1, wherein the surface skin material is colored with a first color, and at least one of the surface-side adhesion layer, the base-side adhesion layer, and the barrier layer, is colored with a second color.

3. A trimming material as in claim 2, wherein the second color is the same as or similar to the first color.

4. A trimming material as in claim 2, wherein the second color is an achromatic color that has substantially the same brightness as the first color.

5. A trimming material as in claim 2, wherein at least one of the base-side adhesion layer and the barrier layer is colored with the second color.

6. A trimming material as in claim 1, wherein the surface skin material is colored with a first color, and at least two of the surface-side adhesion layer, the base-side adhesion layer, and the barrier layer, are respectively colored with a second and third color, that exhibits a fourth color when all of the colors are overlaid with each other.

7. A trimming material as in claim 6, wherein the fourth color is the same as or similar to the first color.

* * * * *